(12) United States Patent
Salter et al.

(10) Patent No.: US 12,415,461 B2
(45) Date of Patent: Sep. 16, 2025

(54) VEHICLE CARGO STORAGE SYSTEM

(71) Applicant: Ford Global Technologies, LLC, Dearborn, MI (US)

(72) Inventors: Stuart C. Salter, White Lake, MI (US); Michael John Harmon, Northville, MI (US); Jeff Robert Seaman, Petersburg, MI (US); Annette Lynn Huebner, Highland, MI (US); Aaron Bradley Johnson, Allen Park, MI (US); Brendan Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 417 days.

(21) Appl. No.: 18/097,680

(22) Filed: Jan. 17, 2023

(65) Prior Publication Data

US 2024/0239270 A1 Jul. 18, 2024

(51) Int. Cl.
*B60R 7/02* (2006.01)
*B60R 5/04* (2006.01)

(52) U.S. Cl.
CPC ............... *B60R 7/02* (2013.01); *B60R 5/04* (2013.01)

(58) Field of Classification Search
CPC ........... B60R 7/02; B60R 5/044; B60R 5/045; B60R 5/04; B60R 5/00; B60R 11/06; B60R 2011/0029; B60R 2011/0036; B60R 2011/0045; B60R 2011/0085
USPC .......... 296/37.1, 37.8, 37.14, 24.3; 224/539, 224/544, 282, 495, 42.35
See application file for complete search history.

(56) References Cited

U.S. PATENT DOCUMENTS

| 3,365,084 A | * | 1/1968 | Fernicola | B60R 5/04 414/466 |
| 6,290,277 B1 | | 9/2001 | Spykerman et al. | |
| 7,097,224 B2 | * | 8/2006 | Lester | B60R 9/00 224/404 |
| 7,384,087 B2 | * | 6/2008 | Littlejohn | B62J 11/00 108/50.01 |
| 7,600,800 B2 | * | 10/2009 | Suzuki | B60R 5/04 296/37.16 |
| 7,621,575 B1 | * | 11/2009 | Kellerman | A61G 21/00 296/18 |
| 7,631,919 B2 | * | 12/2009 | Schrader | B62D 25/10 296/37.6 |
| 7,681,936 B2 | * | 3/2010 | McClintock | B60R 5/04 296/37.16 |

(Continued)

*Primary Examiner* — Amy R Weisberg
*Assistant Examiner* — Wenwei Zhuo
(74) *Attorney, Agent, or Firm* — Vichit Chea; Price Heneveld LLP

(57) ABSTRACT

A vehicle cargo storage system configured to be located in a floor of a vehicle is provided. The vehicle cargo storage system includes a chamber configured to extend into and below the floor of the vehicle, and a cargo holding structure configured to hold one or more cargo items and configured to move between a stowed position within the chamber and a deployed position outside the chamber. The vehicle cargo system also including a cover to a pivot mechanism to pivot the cover between a first closed position covering the one or more cargo items in the chamber and a second position to expose the one or more cargo items outside the chamber, and a locking mechanism configured to be actuated to lock the cover in the first closed position.

14 Claims, 7 Drawing Sheets

(56) References Cited

U.S. PATENT DOCUMENTS

| | | | |
|---|---|---|---|
| 8,162,190 B2 | 4/2012 | Hanson et al. | |
| 9,216,697 B1 | 12/2015 | Hayes | |
| 11,299,100 B1 | 4/2022 | Clifford et al. | |
| 2007/0024077 A1* | 2/2007 | McClintock | B60R 7/02 |
| | | | 296/37.14 |
| 2008/0061576 A1* | 3/2008 | Hwang | B60R 7/02 |
| | | | 296/37.5 |
| 2010/0264180 A1* | 10/2010 | Allotey | B60R 11/06 |
| | | | 224/404 |
| 2016/0207467 A1 | 7/2016 | Parlow et al. | |
| 2016/0288684 A1* | 10/2016 | Christiansson | B60N 3/001 |
| 2019/0210534 A1 | 7/2019 | Causemann et al. | |
| 2020/0101903 A1* | 4/2020 | Skikun | F41A 17/06 |
| 2022/0097611 A1* | 3/2022 | Clifford | B60R 5/04 |

\* cited by examiner

VEHICLE CARGO STORAGE SYSTEM

FIELD OF THE DISCLOSURE

The present disclosure generally relates to vehicle storage systems, and more particularly relates to a vehicle having a convertible cargo storage system.

BACKGROUND OF THE DISCLOSURE

Motor vehicles are commonly equipped with storage compartments for storing one or more items. For example, the rear cargo area of a vehicle may include a hidden storage compartment that extends in a recessed area below the cargo floor and has a removable cover. Quite often, a spare tire or other items may be stored within the rear cargo area storage compartment. It would be desirable to provide for a cargo storage system that allows efficient access to the storage compartment.

SUMMARY OF THE DISCLOSURE

According to a first aspect of the present disclosure, a vehicle cargo storage system configured to be located in a floor of a vehicle is provided. The vehicle cargo storage system includes a chamber configured to extend into and below the floor of the vehicle, a cargo holding structure configured to hold one or more cargo items and configured to move between a stowed position within the chamber and a deployed position outside the chamber, a cover connected to a pivot mechanism to pivot the cover between a first closed position covering the one or more cargo items in the chamber and a second position to expose the one or more cargo items outside the chamber, and a locking mechanism configured to be actuated to lock the cover in the first closed position.

Embodiments of the first aspect of the present disclosure can include any one or a combination of the following features:
- the locking mechanism is hidden from view when the cover is in the first closed position;
- a remote input for actuating the locking mechanism between locked and unlocked states;
- the input comprises a key fob;
- the pivot mechanism comprises at least one pivot rod that rotates the cover at least approximately 180° between the first closed position and the second position;
- the at least one pivot rod is configured to extend into connectors in the floor of the vehicle;
- the cargo holding structure comprises one or more straps;
- the pivot mechanism comprises one or more hinges for rotating the cover about an edge;
- the cargo holding structure comprises a bin configured to hold the one or more cargo items;
- at least one control arm that pivots to allow the bin to move between the stowed and deployed positions; and
- the storage bin comprises a handle.

According to a second aspect of the present disclosure, a vehicle is provided including a cargo floor defining a cargo area and a cargo storage system including a chamber configured to extend into and below the cargo floor, a cargo holding structure configured to hold one or more cargo items and configured to move between a stowed position within the chamber and a deployed position outside the chamber, a cover connected to a pivot mechanism to move between a first closed position covering the one or more cargo items within the chamber and a second position to expose the one or more cargo items outside the chamber, and a locking mechanism configured to be actuated to lock the cover in the first closed position.

Embodiments of the second aspect of the present disclosure can include any one or a combination of the following features:
- the locking mechanism is hidden from view when the cover is in the first closed position;
- a remote input for actuating the locking mechanism between locked and unlocked states;
- the input comprises a key fob;
- the pivot mechanism comprises at least one pivot rod that rotates the cover at least approximately 180° between the first closed position and the second position;
- the at least one pivot rod is configured to extend into connectors in the cargo floor;
- the cargo holding structure comprises one or more straps;
- the pivot mechanism comprises one or more hinges for rotating the cover about an edge, and wherein the cargo holding structure comprises a bin configured to hold the one or more cargo items; and
- at least one control arm that pivots to allow the bin to move between the stowed and deployed positions.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
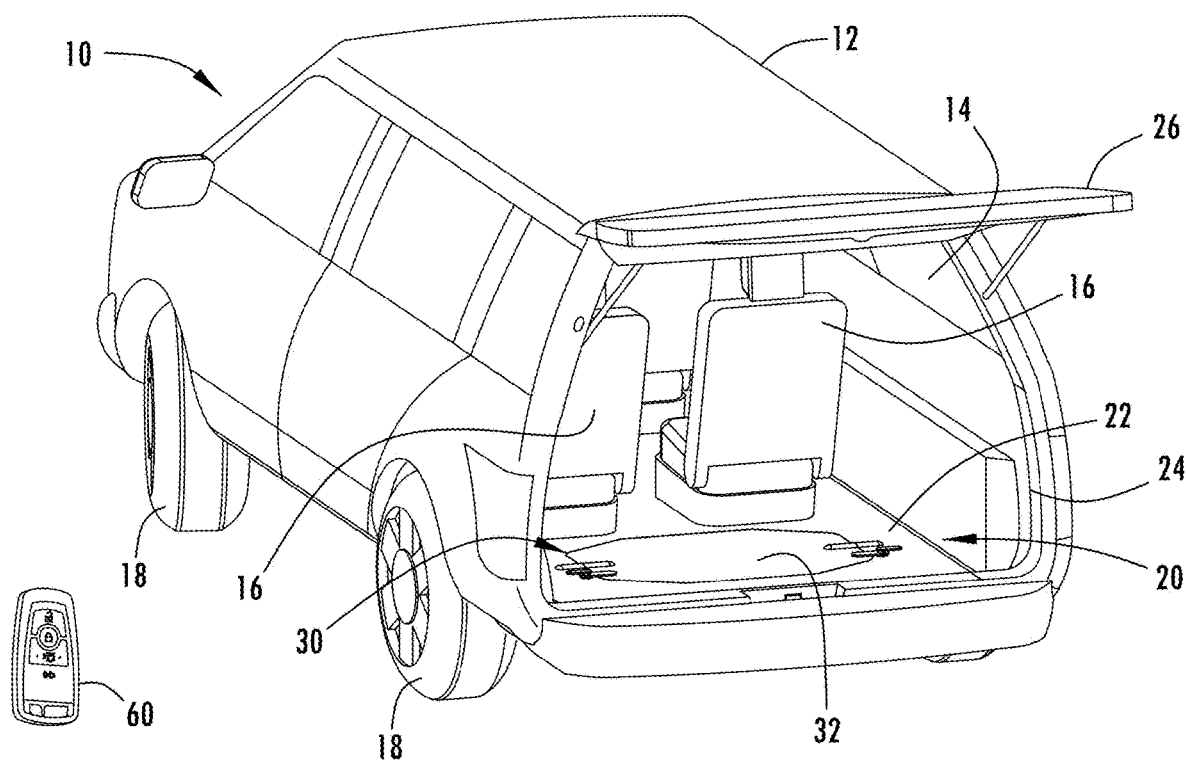
FIG. 1 is a rear perspective view of a motor vehicle having a cargo storage system shown in a stowed cargo position in a rear cargo area, according to a first embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle and vehicle cargo storage system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
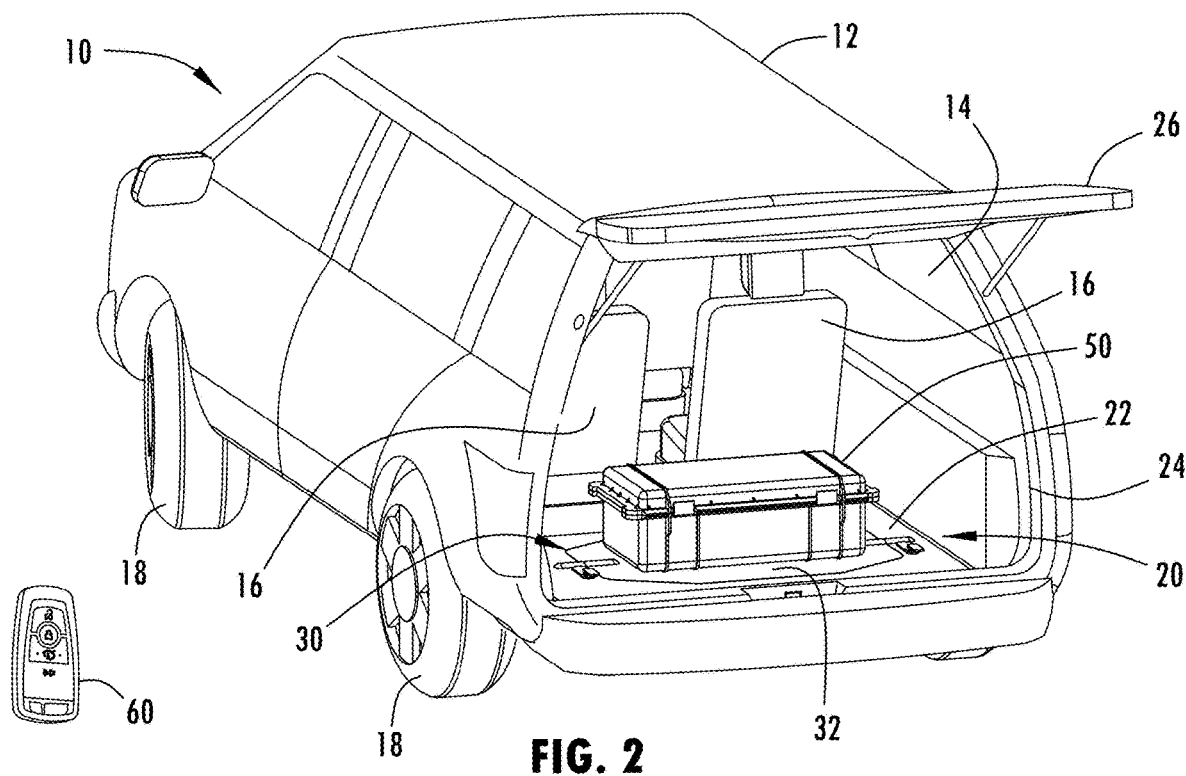
FIG. 2 is a rear perspective view of the motor vehicle further illustrating the cargo storage system of FIG. 1 in a deployed cargo position.

Referring to FIGS. 1 and 2, a wheeled automotive or motor vehicle 10 is generally illustrated configured with passenger seating for transporting one or more passengers, such as a driver of the vehicle and additional passengers, and for further transporting one or more items as cargo onboard the motor vehicle 10. The motor vehicle 10 has a vehicle body 12 that generally defines a cabin interior 14. The cabin interior 14 may contain various features and trim components. The cabin interior 14 is shown having an arrangement of passenger seats 16 which may include a front row of passenger seats and one or more rear rows of passenger seats, each configured to seat a passenger. The motor vehicle 10 shown herein, in one example, is a sport utility vehicle (SUV), however, it should be appreciated that the motor vehicle 10 may otherwise be configured as a van, a car or other motor vehicle having a cargo area configurable to include a cargo storage system.

The motor vehicle 10 is shown as a wheeled motor vehicle having a plurality of wheel assemblies 18 on a chassis which generally supports the body 12. At the rear end of the motor vehicle 10 is a rear door liftgate 26 which is generally configured to which pivots about upper hinges between an open door position shown in FIG. 1 which exposes the cabin interior 14 via a rear opening 24 and a closed door position which closes the rear opening 24. Located proximate to the rear of the motor vehicle 10 forward of the liftgate 26 and rearward of the passenger seats 16 is a rear cargo area 20 which has a cargo floor 22. One or more items of cargo may be located in the rear cargo area 20.

The motor vehicle 10 includes a cargo storage system 30 located in the rear cargo area 20. The storage cargo system 30 is a convertible storage system that converts between a stowed cargo position shown in FIG. 1 and a deployed cargo position shown in FIG. 2. In the stowed cargo position, the cargo is held in a chamber hidden below a lid or cover 32 on the cargo floor 22. The cover 32 may be locked in a locked position with the cargo hidden in the stowed cargo position to prevent tempering or access to the cargo. In the deployed cargo position seen in FIG. 2, the cargo is located above the cargo floor 22 and is exposed and accessible from the cargo area 20 near the rear of the motor vehicle 10. The motor vehicle 10 may communicate with a remote device, such as a key fob 60, which may actuate a lock mechanism to lock the cargo storage system 30 in the stowed cargo position to prevent access to the cargo and to unlock the lock mechanism when access to the cargo is allowed. It should be appreciated that other remote electronic devices such as a phone, an iPad, a computer, a remote switch onboard the vehicle, biometric inputs or voice or gesture interfacing communication input devices may be employed to actuate the lock mechanism between the locked and unlocked states.

Figure 3A:
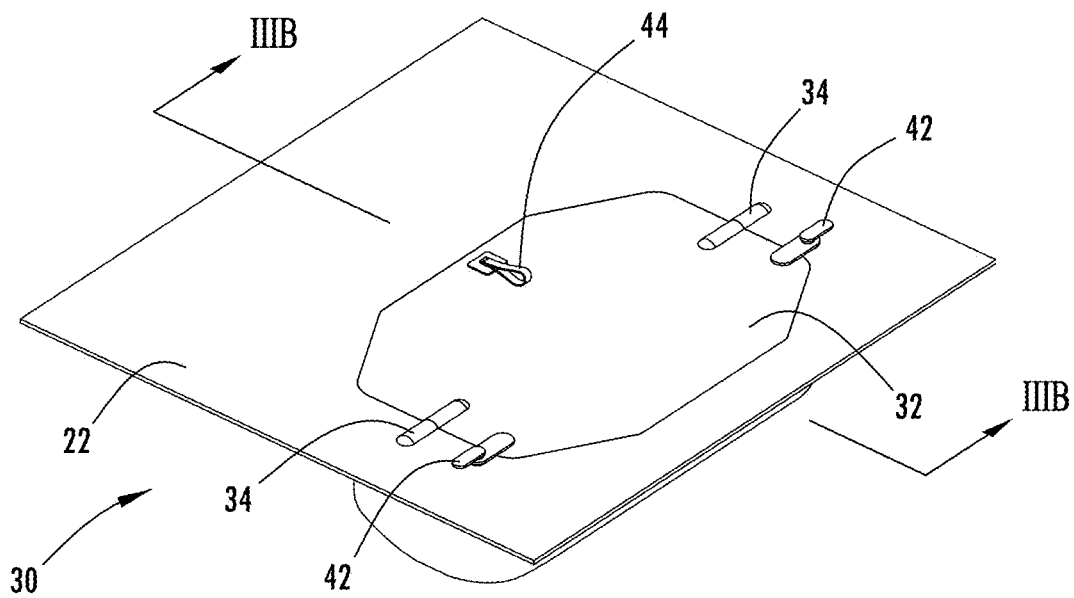
FIG. 3A is an enlarged upper perspective view of the vehicle rear cargo area further illustrating the cargo storage system of FIG. 1 in the stowed cargo position.
Figure 3B:
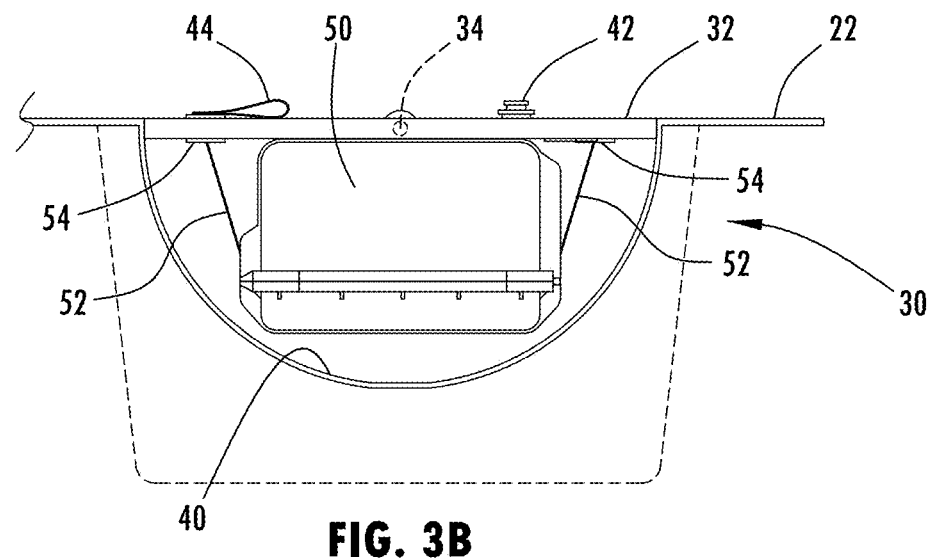
FIG. 3B is a cross-sectional view taken through line IIIB-IIIB of FIG. 3A further illustrating the cargo storage system in the stowed cargo position.
Figure 4A:
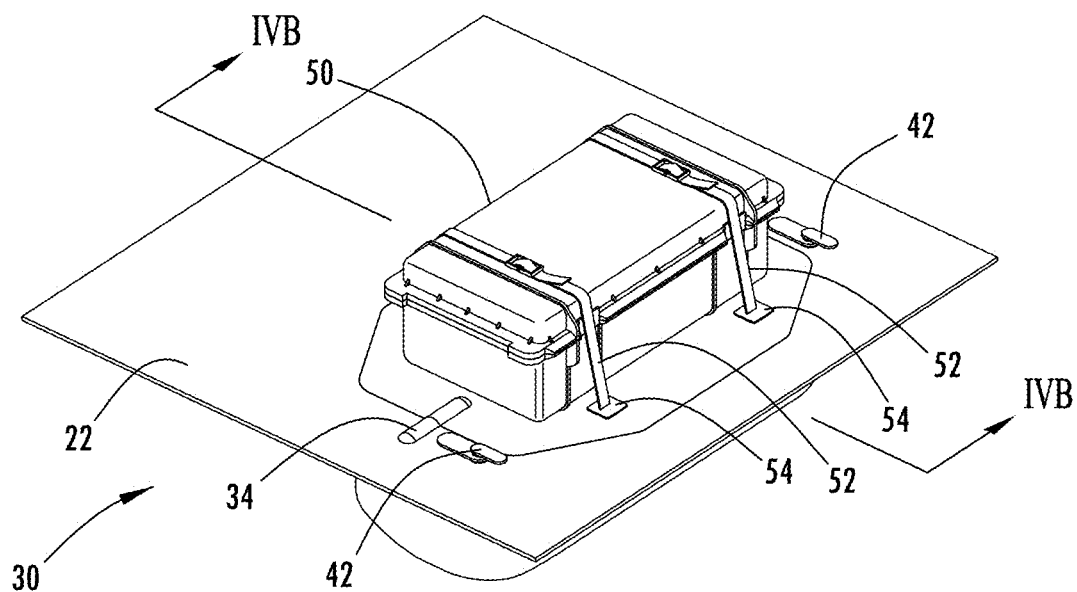
FIG. 4A is an enlarged upper perspective view of the rear cargo area of FIG. 3A further showing the cargo storage system in the deployed cargo position.
Figure 4B:
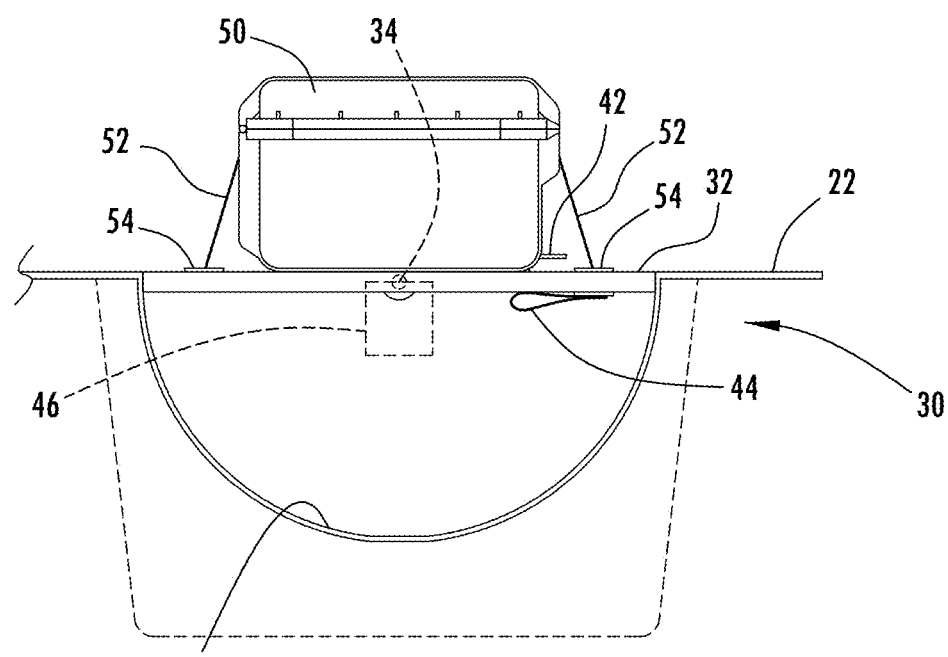
FIG. 4B is a cross-sectional view taken through line IVB-IVB of FIG. 4A further illustrating the cargo storage system in the deployed cargo position.

Referring to FIGS. 3A and 3B, the cargo storage system 30 is further shown in the stowed cargo position having the lid or cover 32 extending across an opening in the rear cargo floor 22 and covering a chamber 40 that extends into and below the cargo floor 22 of the vehicle 10. The chamber 40 is formed as a recess within the rear cargo floor 22 and generally extends downward in a semi-cylindrical shape, according to one example. However, it should be appreciated that the chamber 40 may otherwise be configured in other shapes, such as a rectangle, for example. The chamber 40 may be formed separate from or integrally formed with the cargo floor 22. The cover 32 is shown supported by and pivotally connected to the rear cargo floor 22 by a pivot mechanism that is configured to pivot the cover 32 between a first covered position as seen in FIGS. 3A and 3B which covers the cargo disposed within the chamber 40 and a second position as seen in FIGS. 4A and 4B that exposes the cargo outside and above the chamber 40.

The vehicle cargo storage system 30 includes a cargo holding structure shown as a storage bin 50 which is releasably connected via one or more straps 52 to strap connectors 54 on one side of the cover 32. As such, the cargo holding structure is fixedly attached to one side of the cover 32. The cover 32 has a pivot mechanism shown as a pair of pivot rods 34 that generally extend outward on opposite opposing sides and connect to the rear cargo floor 22. The pivot rods 34 are generally disposed centrally within the cover 32 and allow the cover 32 to pivot along a central axis by at least 180° such that the cover 32 rotates between an upright first and upside-down second position. In the upright first position, the cover 32 has a strap handle 44 on the top side thereof which enables a user to engage the strap handle 44 to pivot the cover 32 between the first and second positions. The cover may pivot 180° from the stowed cargo position shown in FIGS. 3A and 3B to the deployed cargo position shown in FIGS. 4A and 4B when presented in the deployed position. The straps 52 may be unstrapped or otherwise disconnected to allow the bin 50 to be opened to expose one or more items of cargo.

Figure 5:
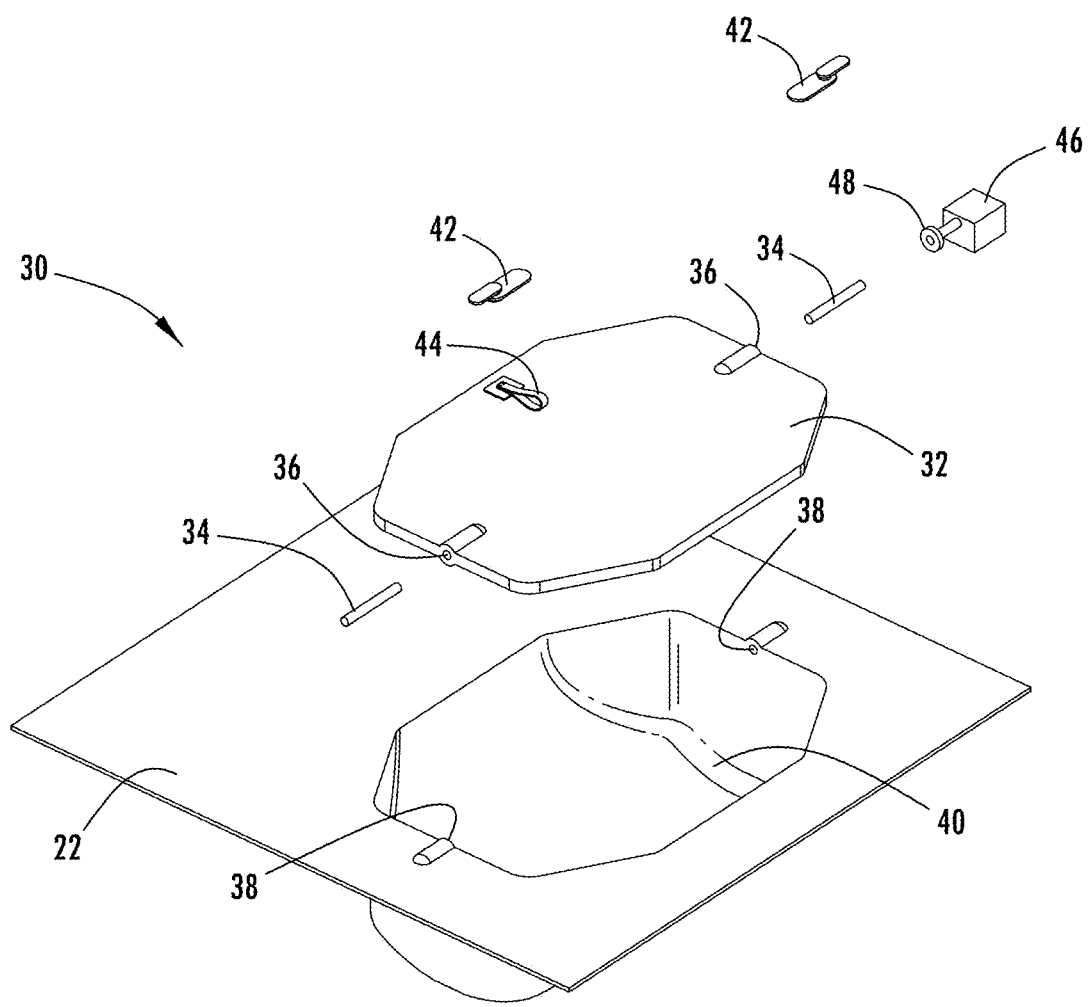
FIG. 5 is an exploded view of the cargo storage system shown in FIG. 3A.

The pivot rods 34 are further shown extending into openings 36 on opposite sides of the cover 32 and further extending into openings 38 on a peripheral edge of the opening in the rear cargo door 32 as seen in FIG. 5. As such, the pair of pivot rods 34 allows the cover 32 to rotate about a central axis extending through the pair of pivot pins 34. It should be appreciated that the cover 32 may further be actuated with an actuator, such as electric motor 46 having an output drive shaft 48 configured to rotate at least one of the pivot pins 34. As such, the cover 32 may be rotated manually by engaging the strap handle 44 or with the actuator via motor 46 actuated in response to an input such as from the key fob 60.

The vehicle cargo storage system 30 further includes a locking mechanism 42 which locks the cover 32 in the stowed cargo position to prevent access to the cargo within the chamber 40. The locking mechanism 42 may be configured as a pair of latches, in which at least one of the latches has a lock that may be actuated via remote control such as with a remote control device such as the key fob 60. As such, access to the cargo stored within the chamber 40 may be controlled via the locking mechanism 42.

Referring to FIGS. 6A-8, a vehicle cargo storage system 130 is illustrated, according to another embodiment. The vehicle cargo storage system 130 is shown generally formed in the rear cargo storage area within the rear cargo floor 22 which may be located on a motor vehicle 10 as shown in the embodiments of FIGS. 1 and 2. In this embodiment, the vehicle cargo storage system 130 has a cover 132 hingedly connected at one edge with a pivot mechanism shown as a pair of hinges 142 to the rear cargo floor 22, and has a handle with a strap 144 located on the opposite lateral edge. As such, a user may engage the handle strap 144 with force to pivot the cover 132 from a first closed cover position shown in FIGS. 6A and 6B to a second open cover position shown in FIGS. 7A and 7B.

Figure 6A:
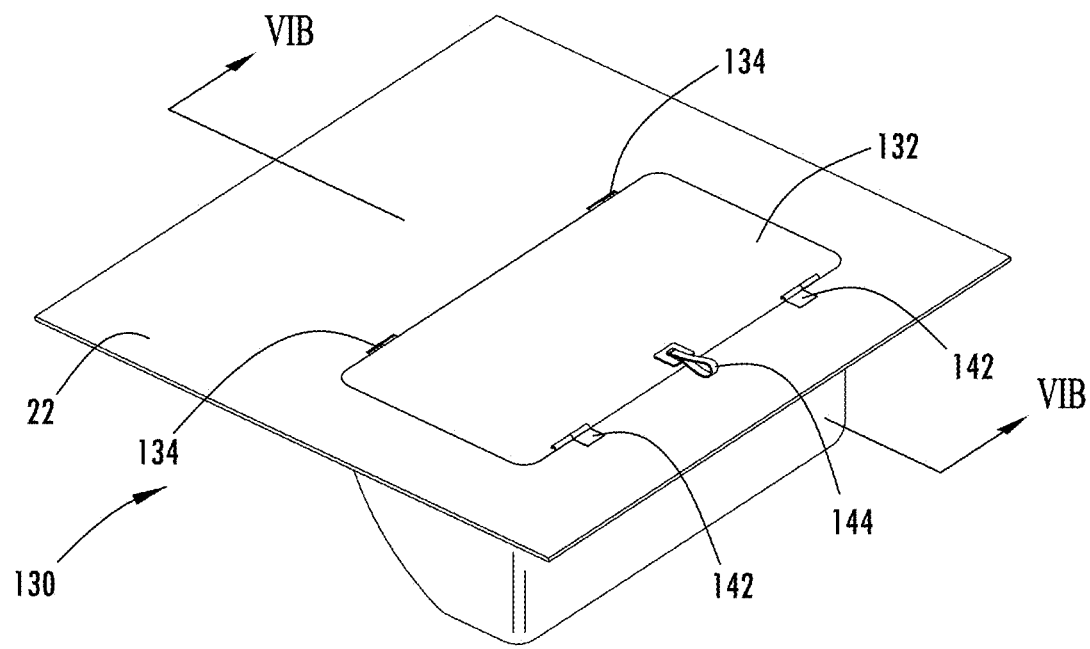
FIG. 6A is an enlarged upper perspective view of a vehicle rear cargo area equipped with a cargo storage system shown in the stowed cargo position, according to a second embodiment.
Figure 6B:
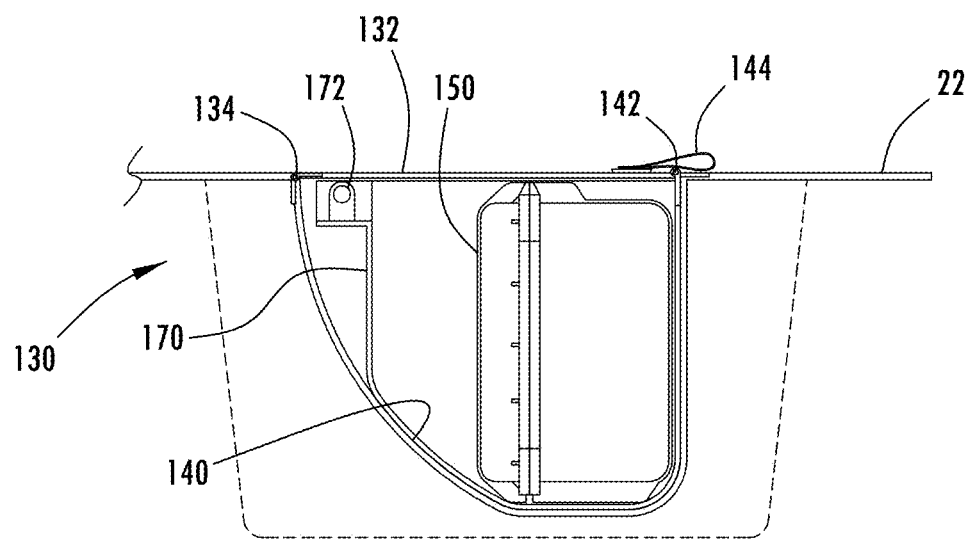
FIG. 6B is a cross-sectional view taken through line VIB-VIB of FIG. 6A further showing the cargo storage system in the stowed cargo position.
Figure 7A:
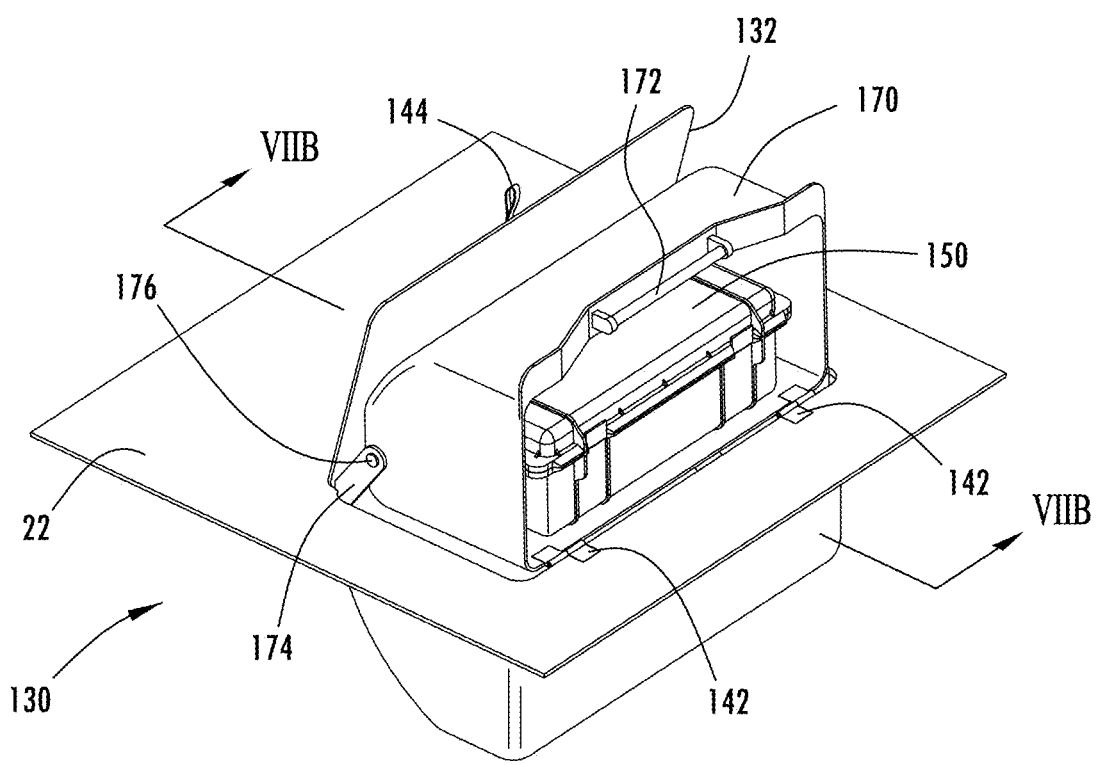
FIG. 7A is an enlarged upper perspective view of the vehicle rear cargo area having the cargo storage system shown in FIG. 6A in a deployed cargo position.
Figure 7B:
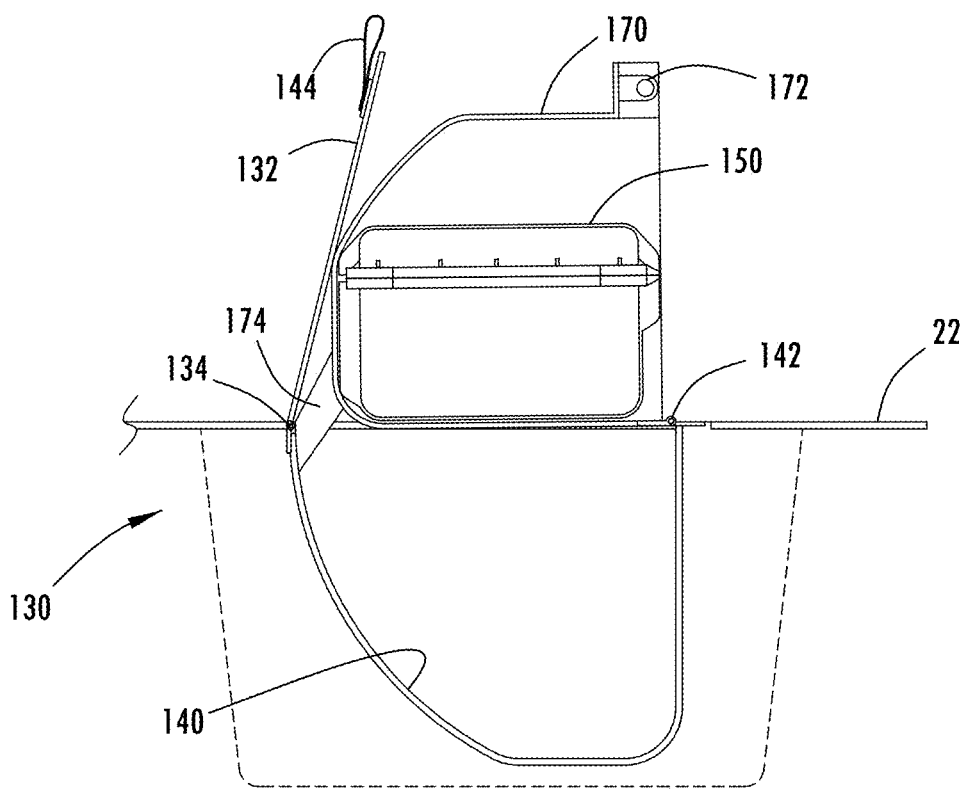
FIG. 7B is a cross-sectional view taken through line VIIB-VIIB of FIG. 7A further illustrating the cargo storage system in the deployed cargo position.
Figure 8:
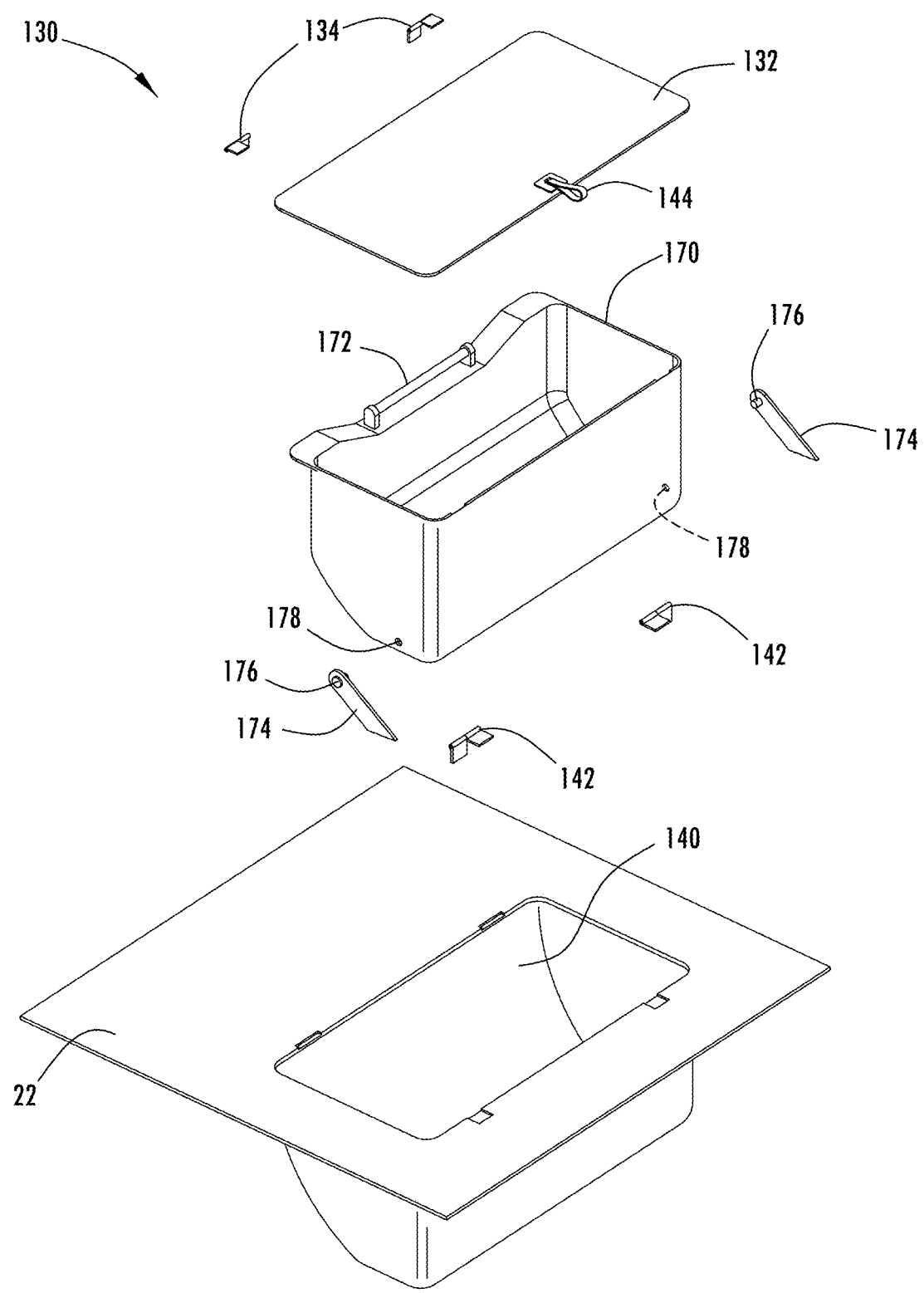
FIG. 8 is an exploded view of the cargo storage system shown in FIG. 6A.

The vehicle storage system 130 has a chamber 140 formed extending into a recess below a lid or cover 132 of the rear cargo floor 122. The chamber 140 may be integrally formed into the rear cargo floor 22 or may be formed separate therefrom. The cover 132 has a handle strap 144 and a pair of hinges 134 on a lateral edge. Disposed within the chamber 140 is a cargo holding structure that includes a bin 170 that moves between a stowed cargo position within the chamber 140 as seen in FIG. 6B and an upward exposed cargo position extending above the chamber as shown in FIGS. 7A and 7B. The storage bin 170 is coupled to a pair of control arms 174 which pivot about a pair of pivot pins 176 on opposite lateral sides to allow the storage bin 170 to rotate approximately 90° as the bin 170 is moved from the stowed cargo position within the chamber 140 to the deployed cargo position outside and above the chamber 140. The storage bin 170 has a handlebar 172 to enable a user to engage and pull or push on the storage bin 170 between the deployed and stowed positions. As such, a user may open the cover 132 and pull on the handlebar 172 of the storage bin to raise the storage bin 170 and rotate the storage bin 170 to a position where another bin 150 carrying cargo may be exposed and accessed by a user. It should be appreciated that the other bin 150 is shown having a container with a lid that may be opened to access the cargo stored therein.

The vehicle cargo storage system 130 further includes a locking mechanism 142 which may be configured as a pair of latches, in which at least one latch has a lock. The locking mechanism 142 is hidden and allows for the cover 132 to be locked when the vehicle cargo storage system 130 is in the stowed cargo position, to thereby limit access to the cargo. The locking mechanisms 142 may be remotely actuated via one or more remote devices similar to those discussed above with respect to the first embodiment, such as with the use of a key fob or other remote communication device. As such, cargo items may remain locked within chamber 140 when desired to prevent access to the cargo.

Accordingly, the vehicle cargo system 30 or 130 advantageously provides for the storage of cargo items onboard the motor vehicle 10. The vehicle cargo system 30 or 130 is convertible between deployed and stowed positions and may advantageously provides for a lock mechanism to lock the cargo when the vehicle cargo system 30 or 130 is in the stowed cargo position.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle cargo storage system configured to be located in a floor of a vehicle, the vehicle cargo storage system comprising:
    a chamber configured to extend into and below the floor of the vehicle;
    a cargo holding structure configured to hold one or more cargo items and configured to move between a stowed position within the chamber and a deployed position outside the chamber;
    a cover connected to a pivot mechanism to pivot the cover between a first closed position covering the one or more cargo items in the chamber and a second position to expose the one or more cargo items outside the chamber, wherein the pivot mechanism comprises at least one pivot rod configured to extend into connectors in the floor of the vehicle, and wherein the at least one pivot rod is generally disposed centrally within the cover to allow the cover to pivot along a central axis at least 180° to allow the cover to rotate between the first closed position and the second closed position; and
    a locking mechanism configured to be actuated to lock the cover in the first closed position.

2. The vehicle cargo storage system of claim 1, wherein the locking mechanism is hidden from view when the cover is in the first closed position.

3. The vehicle cargo storage system of claim 2 further comprising a remote input for actuating the locking mechanism between locked and unlocked states.

4. The vehicle cargo storage system of claim 3, wherein the input comprises a key fob.

5. The vehicle cargo storage system of claim 1, wherein the cargo holding structure comprises a storage bin and one or more straps.

6. A vehicle cargo storage system configured to be located in a floor of a vehicle, the vehicle cargo storage system comprising:
    a chamber configured to extend into and below the floor of the vehicle;
    a cargo holding structure comprising a bin configured to hold one or more cargo items and configured to move approximately 90° between a stowed position within the chamber and a deployed position outside the chamber;
    at least one control arm that pivots to allow the bin to move between the stowed and deployed positions;
    a cover connected to a pivot mechanism to pivot the cover between a first closed position covering the one or more cargo items in the chamber and a second position to expose the one or more cargo items outside the chamber, wherein the pivot mechanism comprises one or more hinges for rotating the cover about an edge; and
    a locking mechanism configured to be actuated to lock the cover in the first closed position.

7. The vehicle cargo storage system of claim 6, wherein the storage bin comprises a handle.

8. A vehicle comprising:
    a cargo floor defining a cargo area; and
    a cargo storage system comprising:
        a chamber configured to extend into and below the cargo floor;
        a cargo holding structure configured to hold one or more cargo items and configured to move between a stowed position within the chamber and a deployed position outside the chamber;
        a cover connected to a pivot mechanism to move between a first closed position covering the one or more cargo items within the chamber and a second position to expose the one or more cargo items outside the chamber, wherein the pivot mechanism comprises at least one pivot rod configured to extend into connectors in the floor of the vehicle, and wherein the at least one pivot rod is generally disposed centrally within the cover to allow the cover to pivot along a central axis at least 180° to allow the cover to rotate between the first closed position and the second closed position; and
        a locking mechanism configured to be actuated to lock the cover in the first closed position.

9. The vehicle of claim 8, wherein the locking mechanism is hidden from view when the cover is in the first closed position.

10. The vehicle of claim 9 further comprising a remote input for actuating the locking mechanism between locked and unlocked states.

11. The vehicle of claim 10, wherein the input comprises a key fob.

12. The vehicle of claim 8, wherein the cargo holding structure comprises one or more straps.

13. The vehicle of claim 8, wherein the pivot mechanism comprises one or more hinges for rotating the cover about an edge, and wherein the cargo holding structure comprises a bin configured to hold the one or more cargo items.

14. The vehicle of claim 13 further comprising at least one control arm that pivots to allow the bin to move between the stowed and deployed positions.

* * * * *